United States Patent

Shirmohamadi

[11] Patent Number: 5,944,255
[45] Date of Patent: Aug. 31, 1999

[54] SHOWER WATER AUTOMATIC TEMPERATURE CONTROLLER

[76] Inventor: Manuchehr Shirmohamadi, Material Integrity Solutions, 3254 Adeline St., #200, Berkeley, Calif. 94703

[21] Appl. No.: 08/921,455

[22] Filed: Aug. 29, 1997

[51] Int. Cl.[6] ............................. G05D 23/12; E03C 1/04
[52] U.S. Cl. ............................................. 236/12.12; 4/677
[58] Field of Search ............................... 236/12.12; 4/677

[56] References Cited

U.S. PATENT DOCUMENTS

| | | | |
|---|---|---|---|
| 4,281,790 | 8/1981 | McGinnis | 236/93 B |
| 4,421,269 | 12/1983 | Ts'ao | 236/12 |
| 4,785,845 | 11/1988 | Kochal | 236/12.12 X |
| 4,854,499 | 8/1989 | Neuman | 236/93 B |
| 4,945,943 | 8/1990 | Cogger | 137/360 |
| 5,090,436 | 2/1992 | Hoch | 137/80 |
| 5,125,433 | 6/1992 | DeMoss | 137/607 |
| 5,240,028 | 8/1993 | Hoch | 137/80 |
| 5,868,311 | 2/1999 | Cretu-Petra | 236/12.12 |

Primary Examiner—William Wayner

[57] ABSTRACT

A self-contained unit 160 that rapidly and accurately senses, controls and maintains the temperature of water delivered to the user of a shower or bath. The invention allows a user to preset a desired water temperature using a manual control interface 60 and uses a sensor 10 located on (or within) the mixer outlet pipe 20 to measure the temperature of the mixed water being delivered to the user. The sensor produces an input signal that is used by a microprocessor 30 to calculate both derivative gain and proportional gain, and fuzzy logic may also be used by the microprocessor to produce an output signal, such that the system responds quickly and accurately to both quantum temperature changes and to the rate of temperature change. The output signal controls a motor 80, that via the action of gears 90, controls the action of the water mixer valve 110 thus maintaining a constant temperature of water delivered to the user. The present invention also allows a number of users to preset temperatures for their own comfort, and to select this preset temperature before entering the shower, so negating the need for manual "trial and error" adjustment. Importantly, the present invention is also designed so that any lay-person, with no plumbing experience and the minimum of mechanical ability may retrofit the device to an existing water delivery system.

20 Claims, 5 Drawing Sheets

Page #2/5

S.W.A.T. Proportional-Derivative Control Algorithm Block Diagram

S.W.A.T. Fuzzy-Logic Control Algorithm Block Diagram

SHOWER WATER AUTOMATIC TEMPERATURE CONTROLLER

BACKGROUND OF THE INVENTION

1. Field of Invention

This invention relates to devices used to control the temperature of water delivered to a domestic shower or bath user, specifically to devices that allow the user to preset the temperature of such delivered water, and to devices that automatically maintain a supply of water at the desired temperature despite changes in water pressure, so reducing the probability of scalding caused by sudden temperature change. Specifically this invention relates to such devices that may be easily retrofitted to existing plumbing systems without the disassembly of piping and without the use of specialized plumbing tools.

2. Description of the Prior Art

Domestic water delivery systems typically comprise pipes for the delivery of both hot and cold water. Conventionally, the temperature of water delivered to a bath, shower and the like is adjusted through the manual operation of valves. In such systems it is common for the temperature of delivered water to fluctuate suddenly by as much as about 20° C. so producing an uncomfortable temperature change and, more seriously, a serious possibility of scalding. Conventional manual valve controls have no way of mitigating these effects.

The most common prior art method for adjusting temperature of delivered water is by sensing the water temperature by hand and then manually turning the faucets as desired.

Automatic means for regulating water temperature have also been disclosed, and the prior art includes the use of a solenoid-operated water valve, connected to hot and cold water pipes, controlled by a series of relay switches wired in series. These relays are controlled by a logic circuit which receives input from a flow-rate sensitive, or temperature sensitive switch (U.S. Pat. No. 5,125,433). In this prior art patent the simple logic circuitry comprises a pulse shaper circuit, a reset pulse circuit and a gate pulse circuit.

It is also known to use a vibrator switch to compare a control signal, produced by a preset control output (chosen by pushing a button), with the signal derived from a temperature sensor positioned somewhere at the water outlet, and to process this differential signal by means of a differential amplifier and a limiter which is then used to activate a reversible motor, opening or closing a water valve, thereby adjusting the flow of water (U.S. Pat. No. 4,421,269). Both the above prior art references allow for push-button selection of shower water temperature.

Another prior art reference describes an electrically operated shut-off valve which closes in response to a preset temperature sensed by a temperature sensor, thereby order to shut off the flow of water during freezing conditions (U.S. Pat. No. 5,240,028).

Another references describes the use of a shut-off valve actuated via a temperature sensitive electric one-way solenoid (U.S. Pat. No. 5,090,436).

Another prior art patent uses a thermostatic valve at the shower head which senses when the delivered water is "too hot" and automatically shuts off the flow of water, in this invention, to restart the water flow, the valve must be manually reset (U.S. Pat. No. 4,281,790).

Another prior art device teaches a temperature sensitive water diverting means which at a preset (uncomfortably hot or cold) temperature diverts the water away from the user and instead directs the water against the shower wall, when the water temperature becomes comfortable again, the water flow reverts back to the shower user (U.S. Pat. No. 4,854, 499).

Prior art inventions that simply shut off the flow of water to the user or diverts the flow of water away from the user do not adequately address the desired aim of delivering a constant flow of water to a user at a steady, unvarying temperature.

The prior art also does not solve the problems of rapid temperature fluctuations of delivered water because the response time of the prior art inventions contains an inherent and significant lag allowing very hot water to reach the user for a significant time before the the temperature is corrected (see FIGS. 1 and 2). Such rapid temperature fluctuations occur when cold water pressure suddenly drops, such as when a toilet is flushed.

Systems that use relay or mechanical inventions, and systems employing proportional-only control circuitry, simply cannot respond to sudden temperature changes fast enough to avoid scalding.

Systems that employ derivative circuitry (such as the invention as described in U.S. Pat. No. 4,421,269, which employs a differential amplifier, a limiter circuit, a polarity relay and a vibrator switch to compare current signals), may provide an improvement over proportional-only circuitry, but these still possesses a significant inherent lag before correcting the water temperature.

Prior art inventions such as those described in U.S. Pat. No. 5,125,433 and U.S. Pat. No. 4,241,269 do not teach the use of an internal low voltage DC dry cell power supply but instead seem to use an external AC mains supply which is rectified and transformed. The presence of an electrical connection between a high voltage AC mains supply and the shower water delivery system poses obvious safety hazards. These hazards are addressed and eliminated in the present invention by the use of internal dry cells. Also, the present invention facilitates easy installation by an untrained member of the public by avoiding the requirement for connecting the device to any AC mains power supply.

Further, the prior art also does not solve the need for a device that controls and corrects for sudden water temperature changes that may be easily and relatively cheaply retrofitted to an existing water delivery system, such as a shower, without the disassembly of piping and without the use of specialized plumbing tools.

There is a need for a device that responds rapidly to sudden water temperature changes in the water delivery pipes and is able to adjust the flow of water through the delivery valve so rapidly that the temperature of the water delivered to a user is relatively constant, and comfortable and cannot result in scalding.

There is a need for such a device that can also be easily and relatively cheaply retrofitted to an existing water delivery system, such as a shower, without the disassembly of piping and without the use of specialized plumbing tools.

The present invention solves the problem of speed of response and temperature adjustment by using a microprocessor. Particularly the present invention can use a dual gain control system which maximizes the speed of temperature mitigation. The present invention can use a microprocessor to calculate both derivative gain and proportional gain, so producing a rapid and accurate output signal that controls the action of the mixer valve in response to both actual discrete, quantum temperature changes and to the rate of such temperature changes. Fuzzy logic circuitry can be used in the present invention to make such calculations and to increase the rate of response.

The present invention also allows a number of users to preset temperatures for their own comfort, such preset temperatures being stored in the memory of the device, whether in a microprocessor or by some other electric or mechanical means, and to select this preset temperature before entering the shower, so negating the need for manual "trial and error" adjustment.

The present invention is also designed so that any layman, with no plumbing experience and the minimum of mechanical ability may retrofit the device to an existing water delivery system. The unit is completely self-contained and possesses its own internal power supply. Fitting can be done in minutes with the use of a screwdriver and an adjustable wrench.

SUMMARY OF THE INVENTION

The present invention is a modular water temperature control device for a domestic shower or bath, which can be easily retrofitted onto an existing water delivery system without the disassembly of piping or the use of specialized plumbing tools.

The invention uses a temperature sensor mounted to the outside (or the inside) of a mixer valve outlet pipe, to sense the temperature of water being delivered to the mixing valve. This sensor may be a thermocouple, or a thermistor, or an RTD (Resistance Temperature Detector), or an integrated circuit temperature sensor, or a temperature-to-fluid pressure transducer or any other means used to sense temperature. This sensor transmits information to a computing unit (which is mounted onto a circuit board) which executes a control algorithm. The computing unit, which may be a microprocessor, or any other means to compare and process two or more input signals, calculates the temperature of the water in the pipe and may also calculate the rate of change of water in the pipe. The computing unit compares this input signal to a preset signal selected by the user. Comparison of these signals produces an output in the form of a derivative gain control signal and/or a proportional gain control signal. Fuzzy logic circuitry may also be used by the computing unit to produce a control gain signal. The computing unit communicates with and controls an electric motor, which in response to a signal from the computing unit, is activated to turn in one direction or another, so opening or closing mixing valve via a torque-transfer mechanism, such as gears, attached to the mixer valve shaft. Power is supplied to the computing unit and to the motor by electric batteries, located within a waterproof housing that contains the entire device. A temperature display is mounted onto the circuit board, as is a control interface comprising buttons or knobs or slide controls.

One skilled in the art will see that the invention may take many different embodiments, some of which are set out below, depending on the arrangement of structural elements.

The objects and advantages of the invention include, but are not limited to: 1) providing a low-cost device that automatically controls and maintains the temperature of water delivered to a shower or bath user. 2) Providing such a device that may be easily retrofitted to a preexisting system without specialized plumbing tools or skills. 3) Providing such a device which reacts very quickly to mitigate temperature changes in delivered water so as to avoid scalding. 4) Providing such a device that allows pre-selection of water temperatures to suit individual users. 5) Providing such a device that is powered by its own, low voltage, internal power supply. 6) Providing such a device that uses both derivative control gain signals and proportional control gain signals to enhance the reaction speed of the device so minimizing the response time for temperature surge mitigation. 7) Providing such a device that may employ fuzzy logic circuitry to enhance the reaction speed of the device so minimizing the response time for temperature surge mitigation. 8) Providing such a device that may be easily and cheaply manufactured from readily available electrical and mechanical components and requiring relatively few purpose-built components.

Still further objects and advantages will become apparent from a consideration of the ensuing description and drawings.

DESCRIPTION OF THE INVENTION

Physical Description

Figure 1:
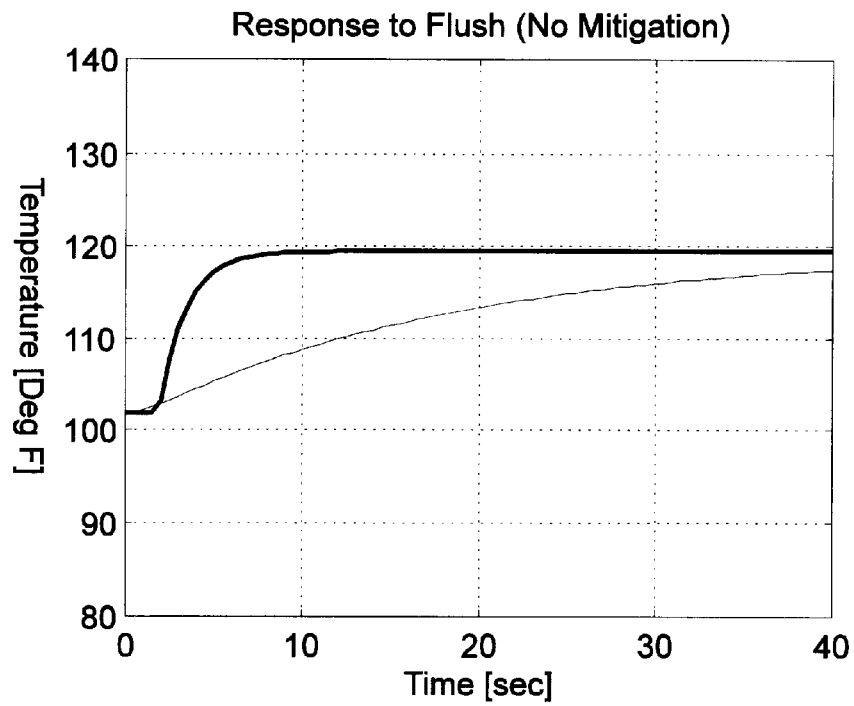
FIG. 1 depicts an actual temperature-time cycle for a shower water delivery system in response to the flushing of a toilet wherein no mitigation device has been fitted.
Figure 2:
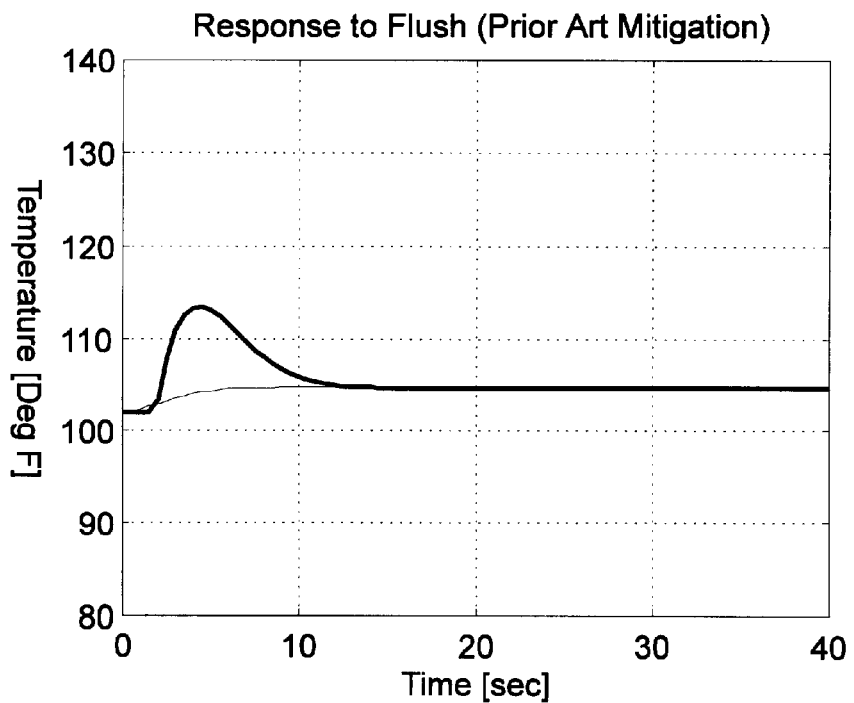
FIG. 2 depicts a temperature-time cycle for a shower water delivery system in response to the flushing of a toilet wherein a prior art mitigation device has been fitted.
Figure 3:
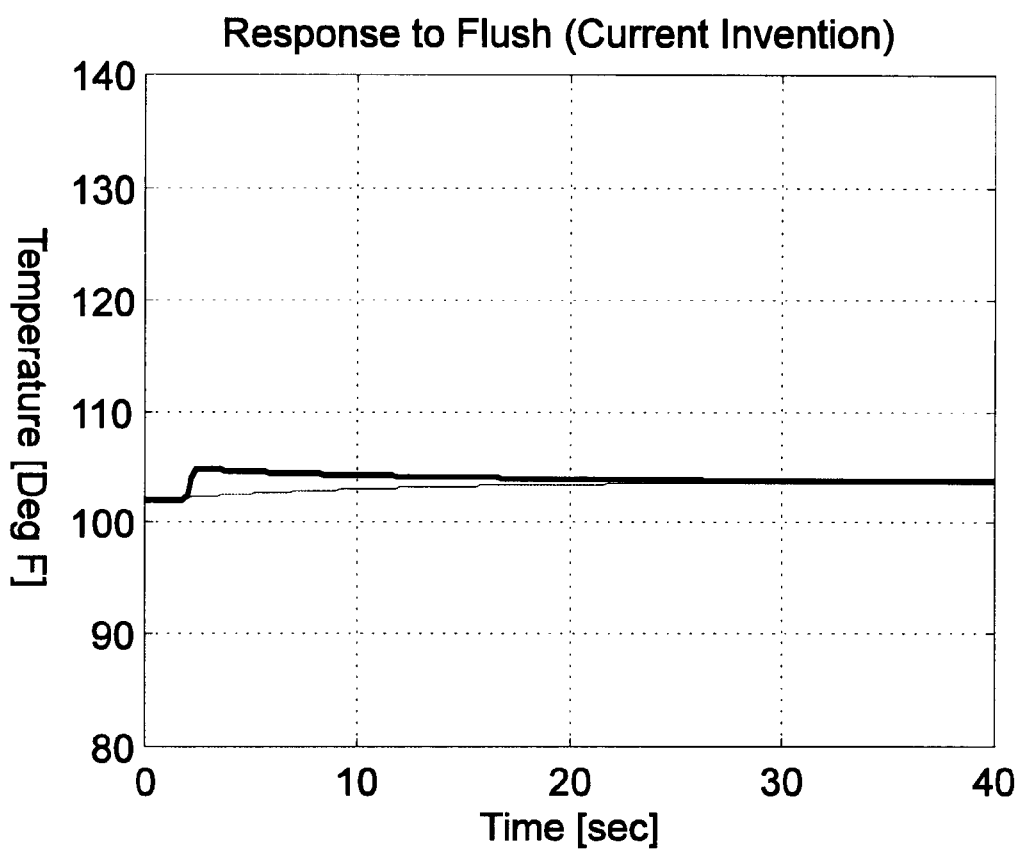
FIG. 3 depicts a temperature-time cycle for a shower water delivery system in response to the flushing of a toilet wherein the instant invention has been fitted.
Figure 4:
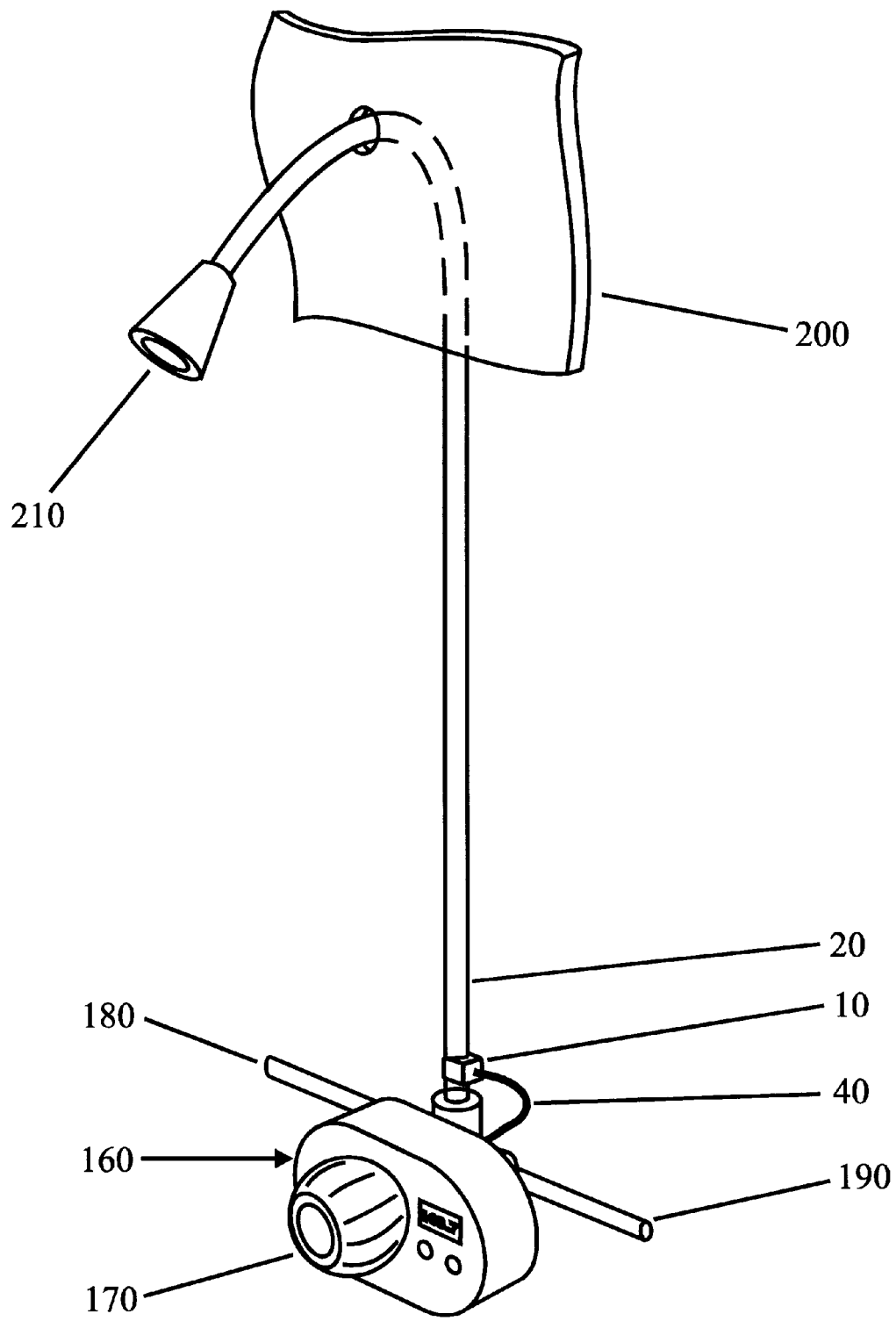
FIG. 4 depicts the overall external setup of the invention when retrofitted to a domestic shower unit.

FIG. 4 shows the overall external setup of the invention when retro-fitted to a domestic shower unit. The sealed temperature control unit 160 is mounted upon the mixing valve shaft 100 (shown in FIG. 5A) and a manual control knob 170 terminally is affixed to the shaft. A hot water pipe 180 and a cold water pipe 190 deliver water to the mixer valve 110. The Sensor 10 is shown positioned on the mixer valve outlet pipe 20. The original plumbing remains behind the wall 200 and the shower head 210 protrudes from the wall.

Figure 5A:
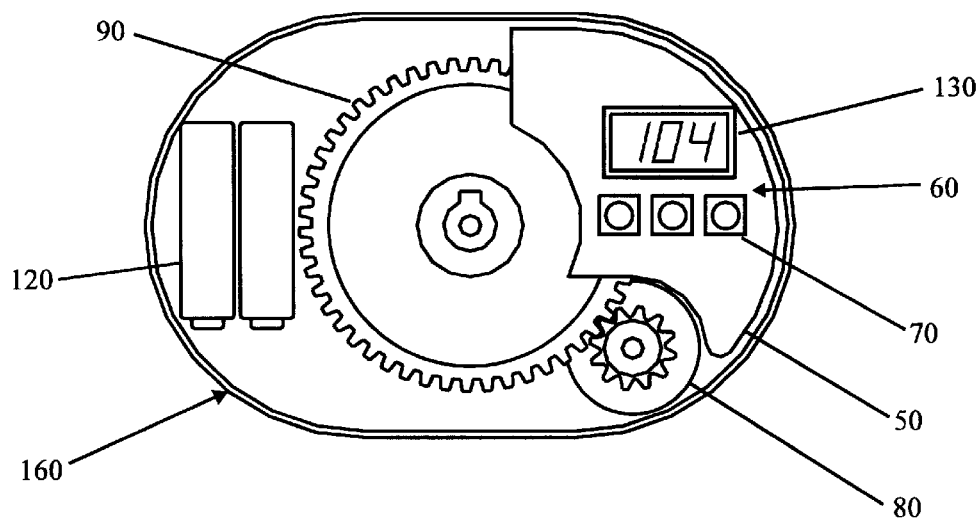
FIG. 5A is a front view of the internal structure of the invention showing the electrical and mechanical components in relation to each other.

FIGS. 5A (side view) and 5B (top plan view) show a typical embodiment of the invention. The temperature sensor 10 is positioned on the outside of the mixer valve outlet pipe 20. This sensor contacts the computing unit 30 by means of a conductor 40. The computing unit is mounted on a circuit board 50 and is additionally contacted by means of conductors within the circuit board to a manual control interface 60. The manual control interface, in this embodiment, comprises a plurality of buttons 70, each corresponding to a particular preset temperature. The computing unit receives signals from both the manual control interface and from the temperature sensor. The output of the computing unit is connected to an electric motor 80. This motor is connected, via a torque-transfer mechanism 90, such as gears, to a shaft 100. The shaft is an integral part of the mixing valve 110, such that when the shaft turns, the flow of hot or cold water is altered. The power for the operation of the motor and the computing unit and for any other electrical component, is provided from an electrical power source, which in the embodiment shown is provided by one or more dry cell batteries 120, located within the unit. Conductors 150 connect the batteries to the components requiring electric power. A temperature display 130, in this embodiment an LCD display, is attached to the circuit board and may display the preselected temperature or the temperature sensed by the temperature sensor. The whole modular unit is is sealed in a watertight capsule 140.

Figure 6:
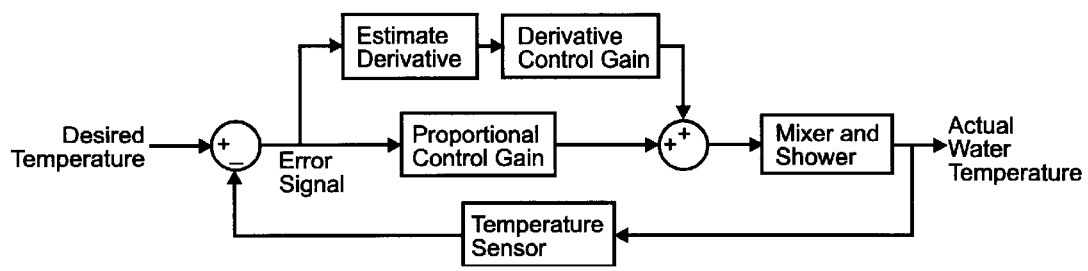
FIG. 6 is a logic diagram that shows both derivative and proportional control gain algorithms used by the computing unit of the invention.
Figure 7:
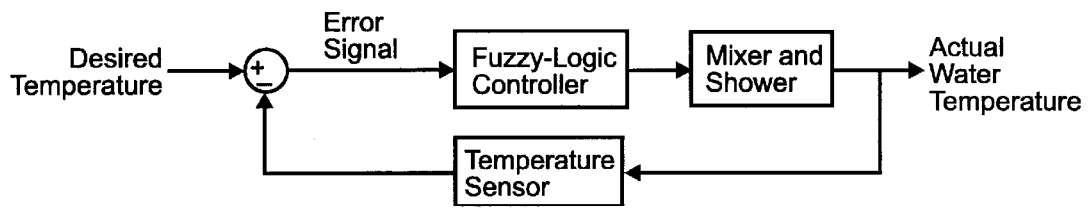
FIG. 7 is a logic diagram that shows the use of a fuzzy logic control algorithm by the computing unit of the invention.

FIGS. 6 and 7 show the logic algorithms used to operate the invention. FIG. 6 is a logic diagram that shows both derivative and proportional control gain algorithms used by the computing unit of the invention. FIG. 7 is a logic diagram that shows the use of a fuzzy logic control algorithm by the computing unit of the invention.

Description of Operation

Figure 5B:
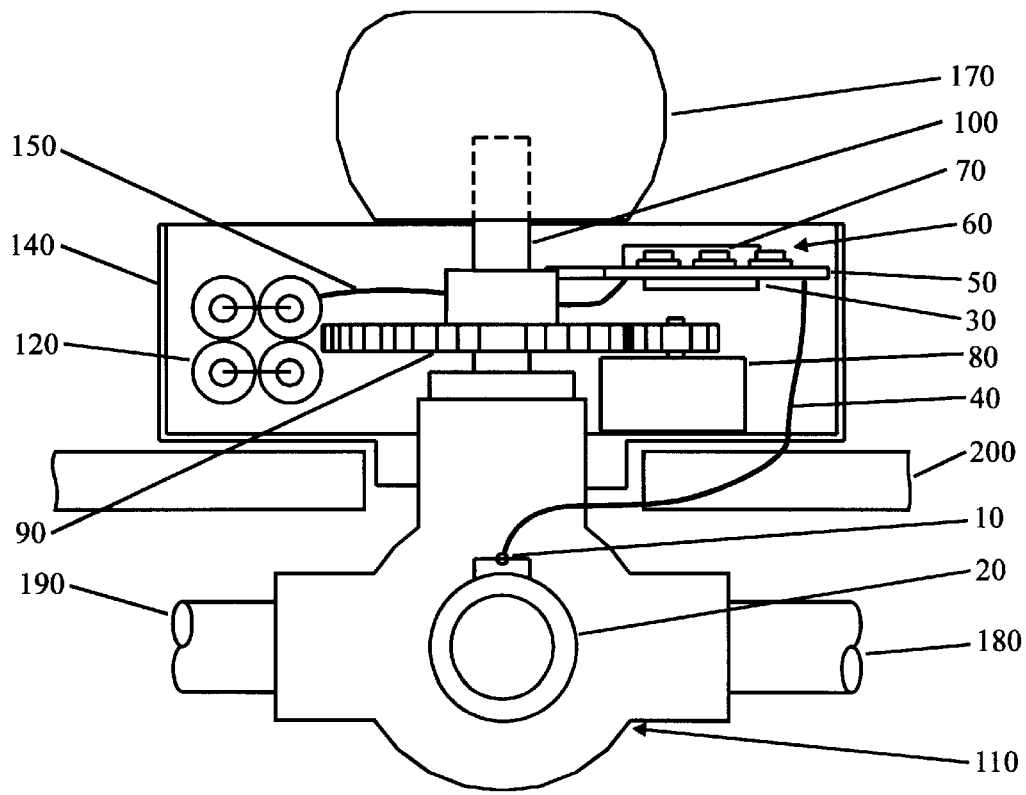
FIG. 5B is a top plan view of the internal structure of the invention showing the electrical and mechanical components in relation to each other.

FIGS. 5A and 5B show a typical embodiment of the invention. The temperature of water in the mixer valve outlet pipe 20 is sensed by the sensor 10. This sensor transmits information about the temperature to the computing unit 30 by means of a conductor 40. The computing unit is mounted on a circuit board 50 and receives a preset temperature input signal selected from a manual control interface 60, this signal represents the desired temperature chosen by the user. The computing unit uses a control algorithm (as illustrated schematically in FIGS. 6 and 7) to compare the preset temperature input signal with the input signal from the temperature sensor. The computing unit may perform calculations that allow proportional, derivative or fuzzy-logic control of the system.

The computing unit produces an output control signal that controls the operation of the electric motor. If the computing unit senses that the temperature of water in the mixer outlet pipe is too high, or is rising at a rate that will result in overly hot water being delivered to the user, then the computing unit will produce an output signal that will cause the motor to operate in such a way as to move the mixer valve so as to decrease the flow of hot water and to increase the flow of cold water, thereby mitigating the rise in temperature of delivered water. The computing unit can also function in a similar way to mitigate a sudden decrease in water temperature, effectively maintaining the water temperature within a comfortable narrow range about the temperature selected by the user.

SUMMARY, RAMIFICATIONS AND SCOPE

Accordingly, it will be apparent that the invention, when fitted to a water supply system such as a bath or shower, will automatically and quickly compensate for sudden changes in the water temperature which may be caused to sudden changes in water pressure, caused, for instance, by the flushing of a toilet. The invention mitigates water temperature changes so rapidly that the temperature of the water delivered to a user is relatively constant, and comfortable and cannot result in scalding. The present invention can use a combination of derivative gain control and proportional gain control and fuzzy logic gain control to produce a rapid and accurate output signal that controls the action of the mixer valve in response to both quantum temperature changes and to the rate of such temperature changes.

The present invention is also designed so that any average lay-person, with no plumbing experience and the minimum of mechanical ability may retrofit the device to an existing water delivery system, such as a shower, without the disassembly of piping and without the use of specialized plumbing tools. The unit is completely self-contained and possesses its own internal power supply. Fitting can be done in minutes with the use of a screwdriver and an adjustable wrench.

The present invention also allows a number of users to preset temperatures for their own comfort, such preset temperatures being stored in the memory of the device, so always ensuring the same selected water temperature without the need for manual "trial and error" adjustment, and for which the temperature of the delivered water is independent of the temperature of the water in the hot or cold water pipes prior to mixing.

Although the description above contains many specificities, these should not be constructed as limiting the scope of the invention but as merely providing illustrations of some of the presently preferred embodiments for this invention. Thus the scope of the invention should be determined by the appended claims and their legal equivalents, rather than by the examples given above.

What is claimed is:

1. For a water delivery system having a single-stemmed mixer valve and a single mixer valve outlet pipe, a modular water temperature control device which can be easily retrofitted onto an existing water delivery system without the disassembly of piping or the use of specialized plumbing tools, comprising:

a temperature sensor contacting said mixer valve outlet pipe, a computing unit executing a control algorithm, said computing unit communicating with said sensor by means of a conducting wire, said computing unit being mounted onto a circuit board, said computing unit further communicating with and controlling the operation of an electric motor, an electric power source communicating with and supplying power to said motor and said computing unit, said motor communicating with a torque-transfer mechanism, said torque-transfer mechanism communicating with a shaft, said shaft communicating with said mixing valve such that rotation of said shaft tends to alter the flow of water, a temperature display mounted onto said circuit board, a manual control interface, communicating with said circuit board, a watertight case enclosing said modular water temperature control unit which can replace the existing wall cover unit.

2. A modular water temperature control unit according to claim 1 wherein said temperature sensor is selected from the group consisting of a thermocouple, a thermistor, a Resistance Temperature Detector (RTD), an integrated circuit temperature sensor, or a temperature-to-fluid pressure transducer.

3. A modular water temperature control unit according to claim 1 wherein said computing unit is a microprocessor unit.

4. A modular water temperature control unit according to claim 3 wherein said microprocessor unit receives a preset input signal, selected by the user, and at least one variable input signal, from said temperature sensor.

5. A modular water temperature control unit according to claim 4 wherein said microprocessor unit calculates both derivative control gain and proportional control gain.

6. A modular water temperature control unit according to claim 4 wherein said microprocessor unit uses fuzzy logic to estimate control gain and to produce an output signal.

7. A modular water temperature control unit according to claim 1 wherein said computing unit is an operational amplifier-based analog computer.

8. A modular water temperature control unit according to claim 1 which can be programmed to deliver water at any one of a number of temperatures.

9. A modular water temperature control unit according to claim 1 wherein said electric motor is a brushed direct current electric motor.

10. A modular water temperature control unit according to claim 1 wherein wherein said electric motor is a stepping motor.

11. A modular water temperature control unit according to claim 1 wherein said torque-transfer mechanism is selected from a group consisting of linkages, gears, pulleys, cables, hydraulic elements, or pneumatic elements.

12. A modular water temperature control unit according to claim 1 wherein said electric power source is a an electric battery.

13. A modular water temperature control unit according to claim 1 wherein said electric power source is an electric dry cell battery.

14. A modular water temperature control unit according to claim 1 wherein said electric power source is selected from the group consisting of an alternating current mains supply a direct current supply produced by transformation of an alternating current mains supply.

15. A modular water temperature control unit according to claim 1 wherein said electric power source is a turbogenerator which is placed in the stream of water so as to generate an electric current.

16. A modular water temperature control unit according to claim 1 wherein said manual control interface is selected from a group consisting of a plurality of buttons, a rotatable knob, or a linear slide control, which may be used to set the temperature of the water delivered to the user.

17. A modular water temperature control unit according to claim 15 wherein said buttons correspond to pre-set water temperatures.

18. A modular water temperature control unit according to claim 1 wherein said unit provides for the rapid mitigation of temperature surges of delivered water caused by sudden changes in water pressure.

19. A modular water temperature control unit according to claim 1 wherein said temperature sensor is mounted within the interior of said mixer valve outlet pipe.

20. A modular water temperature control unit according to claim 1 wherein said temperature sensor is mounted on the outside of said mixer valve outlet pipe.

* * * * *